(12) United States Patent
Ackerman (10) Patent No.: US 11,209,639 B2
(45) Date of Patent: Dec. 28, 2021

(54) SELF-CONTAINED BINOCULAR SIGHTING SYSTEM

(71) Applicant: Jim Ackerman, South Jordan, UT (US)

(72) Inventor: Jim Ackerman, South Jordan, UT (US)

( * ) Notice: Subject to any disclaimer, the term of this patent is extended or adjusted under 35 U.S.C. 154(b) by 0 days.

(21) Appl. No.: 17/172,264

(22) Filed: Feb. 10, 2021

(65) Prior Publication Data
US 2021/0255450 A1    Aug. 19, 2021

Related U.S. Application Data (60) Provisional application No. 62/976,578, filed on Feb. 14, 2020.

(51) Int. Cl.

| | | |
|---|---|---|
| G02B 23/18 | (2006.01) | |
| G02B 23/20 | (2006.01) | |
| A45F 3/04 | (2006.01) | |
| G02B 7/00 | (2021.01) | |
| A45F 5/00 | (2006.01) | |
| A45C 11/08 | (2006.01) | |
| F16M 13/04 | (2006.01) | |
| F16M 11/04 | (2006.01) | |
| F16M 11/10 | (2006.01) | |
| F16M 11/20 | (2006.01) | |
| F16M 11/28 | (2006.01) | |

(52) U.S. Cl.
CPC ............. *G02B 23/18* (2013.01); *A45C 11/08* (2013.01); *A45F 3/04* (2013.01); *A45F 5/00* (2013.01); *F16M 11/041* (2013.01); *F16M 11/048* (2013.01); *F16M 11/10* (2013.01); *F16M 11/2021* (2013.01); *F16M 11/28* (2013.01); *F16M 13/04* (2013.01); *G02B 7/002* (2013.01); *G02B 23/20* (2013.01); *A45F 2003/045* (2013.01)

(58) Field of Classification Search
USPC ............... 248/123.11, 123.2, 280.11, 292.11, 248/297.11
See application file for complete search history.

(56) References Cited

U.S. PATENT DOCUMENTS 2,711,122 A * 6/1955 Klumpp ............. F16M 11/2021
224/185
5,073,788 A * 12/1991 Lingwall ............. F16M 11/048
396/425

(Continued)

*Primary Examiner* — Alfred J Wujciak
(74) *Attorney, Agent, or Firm* — Lyman Moulton, Esq.; Moulton Patents, PLLC (57) ABSTRACT

The disclosure includes a monopod adapted for a pack or harness. It utilizes a simple mechanism which is lightweight, self-contained and easy to set-up and take down. The user never has to access another piece of equipment, nor assemble or disassemble any parts in use. Indeed, the user can access or store binoculars while on the move. The user can also shift to other fields of view instantly, without having to turn, re-level or adjust the set-up, as would be required with a tripod. The disclosure comprises a scope bracket configured to rotatably attach to a scope mount. A telescoping arm attaches to the scope bracket in a first angle relative to the telescoping arm. A telescoping arm bracket rotatably attaches to the telescoping arm in a second angle relative to the telescoping arm. A back plate supports the telescoping arm bracket against a chest of a user.

19 Claims, 6 Drawing Sheets

(56) References Cited

U.S. PATENT DOCUMENTS

| | | | | |
|---|---|---|---|---|
| 5,332,136 | A * | 7/1994 | Rudolph | F16M 11/2021 224/185 |
| 8,418,900 | B1 * | 4/2013 | Baker | A45F 3/14 224/262 |
| 2014/0204233 | A1 * | 7/2014 | Liu | G02B 23/12 348/222.1 |
| 2014/0312090 | A1 * | 10/2014 | Garza, Jr. | F16M 13/04 224/600 |
| 2020/0081239 | A1 * | 3/2020 | Hamm | G02B 23/18 |

* cited by examiner

SELF-CONTAINED BINOCULAR SIGHTING SYSTEM

BACKGROUND

Hunters, birders and other binocular users often find they cannot hold binoculars still for extended periods of time, due to fatigue to the arms and shoulders from holding the binoculars up to the eyes. Mounting binoculars on tripods is time consuming and requires set-up and take-down time as well as packing additional pieces of equipment.

All other attempts to solve the fatigue problem utilize more complex and awkward mechanisms that are cumbersome, heavy, and require extensive set up and take-down. They are also large and bulky for the most part, making them impractical for use in the field.

An apparatus or system to simplify the use of binoculars for extended periods of time without enduring fatigue to the arms and shoulders from holding binoculars to the eyes, and from carrying heavy and cumbersome equipment for mounting binoculars when hunting, bird watching, or other uses. Or a device or system to also save time from extensive set up and take-down of necessary equipment for mounting binoculars. There have been no products available as original equipment or as an aftermarket to address this problem either.

There exists a need for an improved device and/or system that is not being met by any known or disclosed device or system of present.

SUMMARY OF THE INVENTION

The present invention overcomes the above referred to difficulties in a convenient, simple and efficient manner. Self-Contained Binocular Sighting System utilizes a simple mechanism which is lightweight, self-contained and easy to set-up and take-down. The user never has to access another piece of equipment, nor assemble or disassemble any parts in use. Indeed, the user can access or store binoculars while on the move. The user can also shift to other fields of view instantly, without having to turn, re-level or adjust the set-up, as would be required with a tripod. There have been no products available as original equipment or as an aftermarket to address this problem.

The disclosure comprises a scope bracket configured to rotatably attach to a scope mount. A telescoping arm attaches to the scope bracket in a first angle relative to the telescoping arm. A telescoping arm bracket rotatably attaches to the telescoping arm in a second angle relative to the telescoping arm. A back plate supports the telescoping arm bracket against a chest of a user.

Throughout the description, similar reference numbers may be used to identify similar elements depicted in multiple embodiments. Although specific embodiments of the invention have been described and illustrated, the invention is not to be limited to the specific forms or arrangements of parts so described and illustrated. The scope of the invention is to be defined by the claims appended hereto and their equivalents.

DETAILED DESCRIPTION

Reference will now be made to exemplary embodiments illustrated in the drawings and specific language will be used herein to describe the same. It will nevertheless be understood that no limitation of the scope of the disclosure is thereby intended. Alterations and further modifications of the inventive features illustrated herein and additional applications of the principles of the inventions as illustrated herein, which would occur to one skilled in the relevant art and having possession of this disclosure, are to be considered within the scope of the invention.

Figure 1:
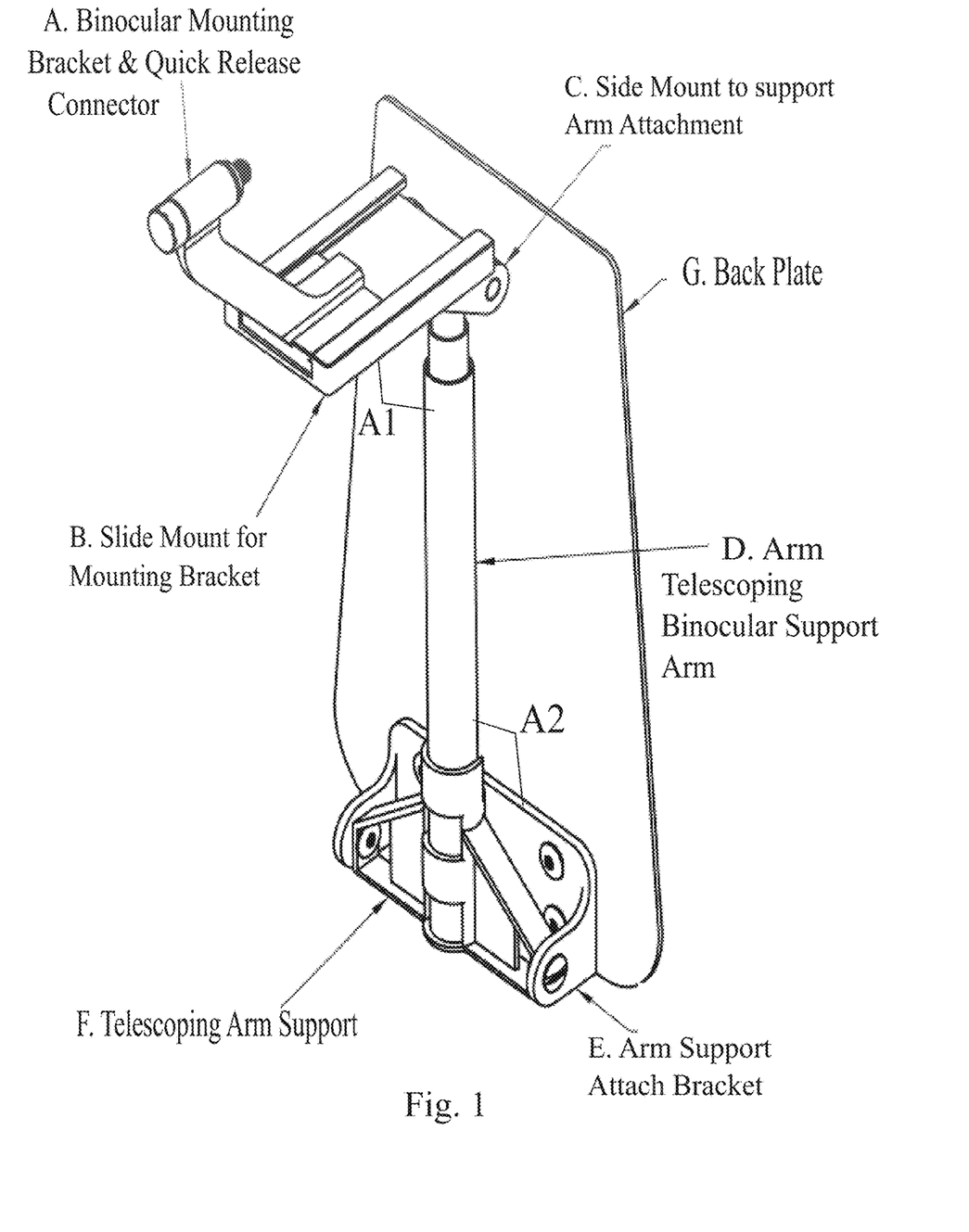
FIG. 1 is a front perspective view of the Self-Contained Binocular Sighting apparatus in accordance with an embodiment of the present disclosure.

FIG. 1 is a front perspective view of the Self-Contained Binocular Sighting apparatus showing: Binocular Mounting Bracket & Quick Release Connector referenced as A., Slide Mount for Mounting Bracket referenced as B., Slide Mount to Support Arm Attachment referenced as C., Telescoping binocular Support Arm referenced as D., Arm Support Attach Bracket referenced as E., Telescoping Arm Support referenced as F., Back Plate referenced as G., in accordance with an embodiment of the present disclosure. The angle A1 relative to the telescoping arm D and between the scope bracket also known as the binocular mounting bracket and quick release connector B, is greater than ninety degrees but less than one hundred and eighty degrees. The angle A1 is also limited by a boss on the telescoping arm, also known as telescoping binocular support arm D in an embodiment of the disclosure. The angle A1 is also limited by a boss on the bracket B in some other embodiments. The angle A2 also relative to the telescoping arm D and between the arm support bracket E and the telescoping arm support F is less than ninety degrees in the embodiment of the disclosure. The angle A2 is also limited by a boss on the telescoping arm, also known as telescoping binocular support arm D in an embodiment of the disclosure. The angle A2 is also limited by a boss on the bracket E or the telescoping arm support F in some other embodiments.

Figure 2:
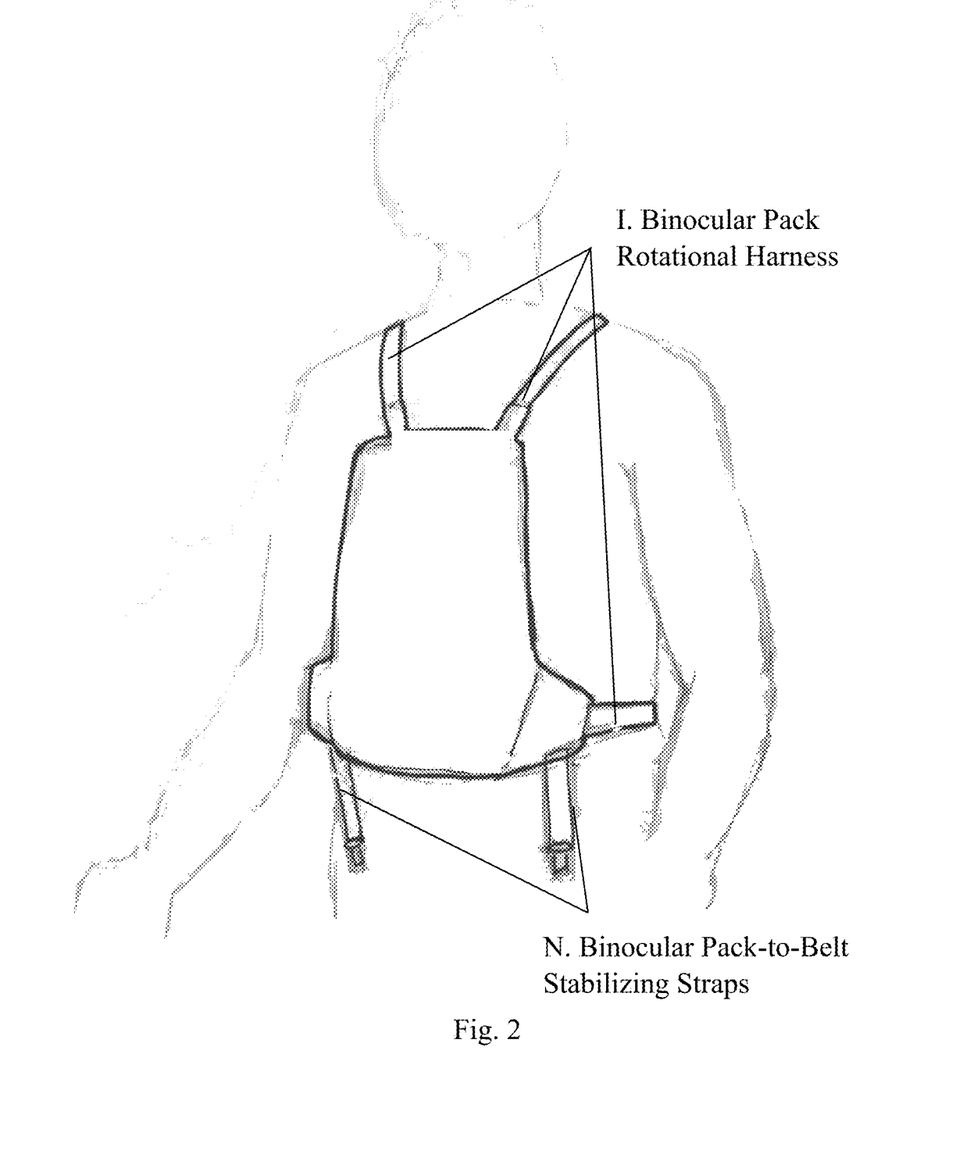
FIG. 2 is a front perspective view of an undeployed Self-Contained Binocular Sighting System apparatus in accordance with an embodiment of the present disclosure.

FIG. 2 is a front perspective view of an undeployed Self-Contained Binocular Sighting System apparatus showing: Binocular Pack, Rotational Harness referenced as I., Binocular Pack-to-Belt Stabilizing Straps referenced as N., in accordance with an embodiment of the present disclosure. The rotational harness I for the binocular pack self-adjusts to a shoulder width of a user. The rotational harness I is implemented via rivets, straps and other attachments. Other limitations with the same reference characters apply to similar or same limitations of other figures herein.

Figure 3:
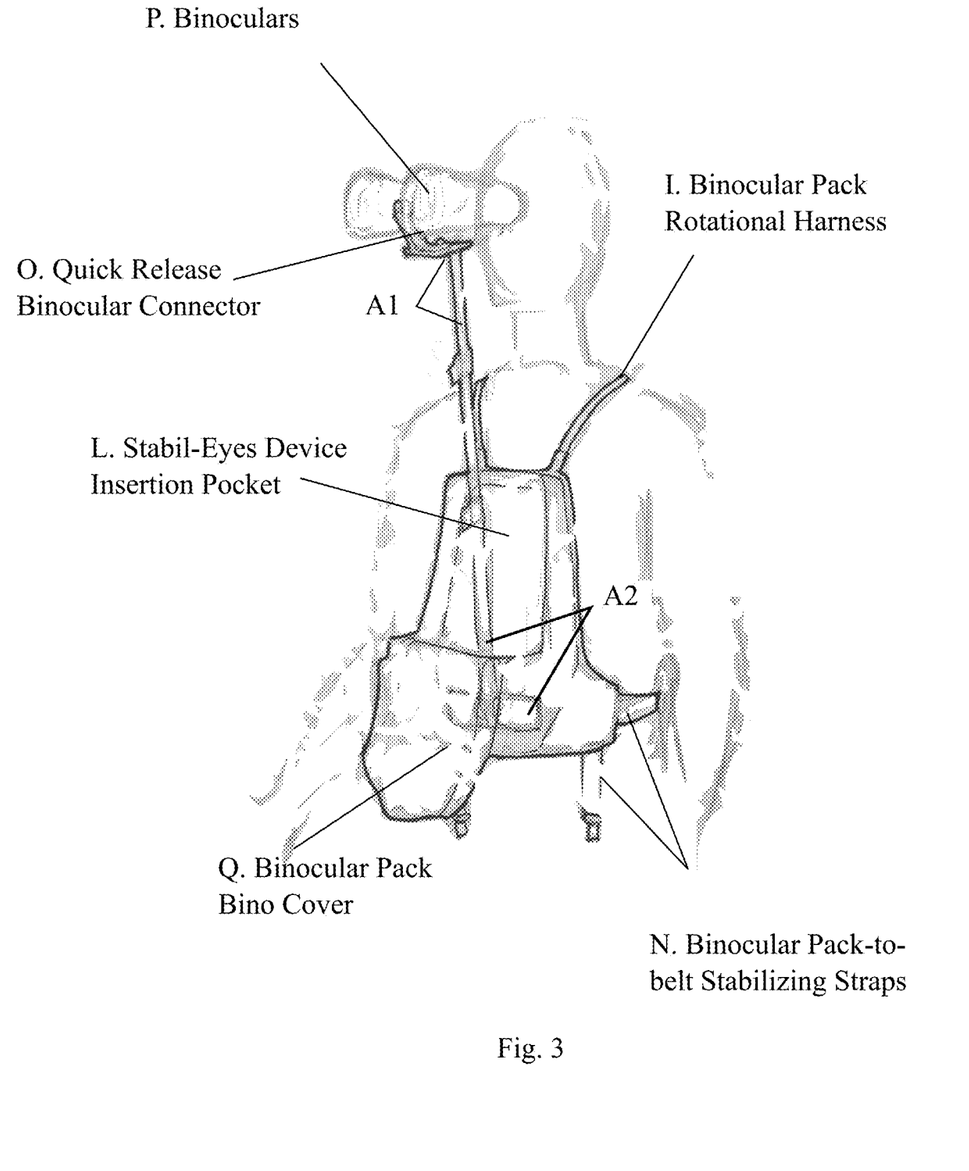
FIG. 3 is a front perspective view of a deployed Self-Contained Binocular Sighting System apparatus in accordance with an embodiment of the present disclosure.
Figure 6:
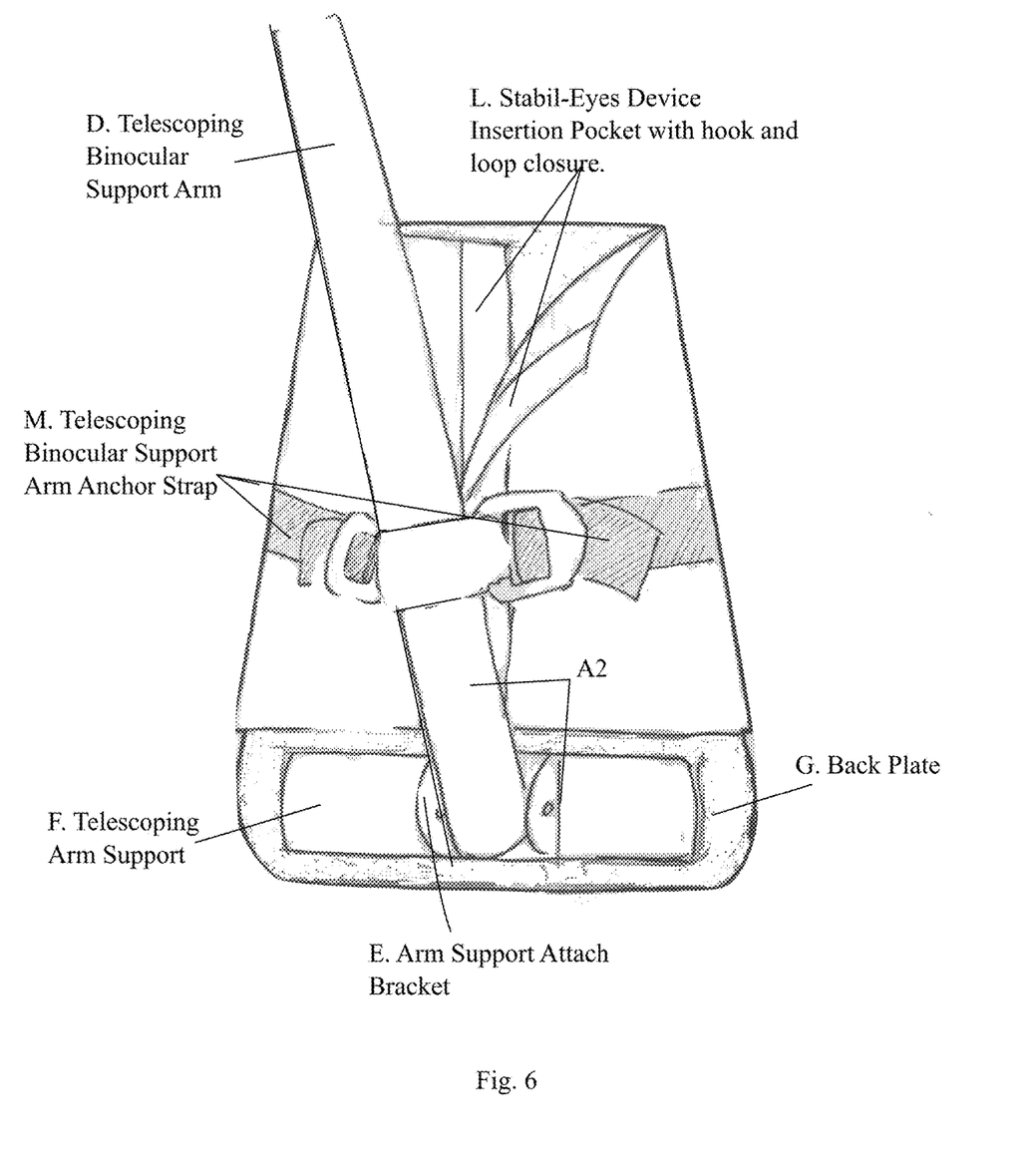
FIG. 6 is a front perspective view of the deployed Self-Contained Binocular Sighting System apparatus in accordance with an embodiment of the present disclosure.

FIG. 3 is a front perspective view of a deployed Self-Contained Binocular Sighting System apparatus showing: Binocular Pack Rotational Harness referenced as I., Stabil-Eyes Device Insertion Pocket referenced as L., Binocular Pack-to-Belt Stabilizing Straps referenced as N., Quick Release Binocular Connector referenced as O., Binoculars referenced as P. and Binocular Pack Bino Cover referenced as Q., in accordance with an embodiment of the present disclosure. Angles A1 and A2 are described in detail regarding FIG. 1 in text above. The telescoping arm adjusts via concentric locks on each segment of the telescoping arm. The locks allow a positioning of the binoculars to a stable and adjustable height. The view also includes the Telescoping Binocular Support Arm Anchor Strap M as shown in FIG. 6 and an overlap portion T of the Binocular Pack Bino Cover Q onto the Telescoping Binocular Support Arm D as depicted. The view also includes the Telescoping Arm Support F as shown.

Figure 4:
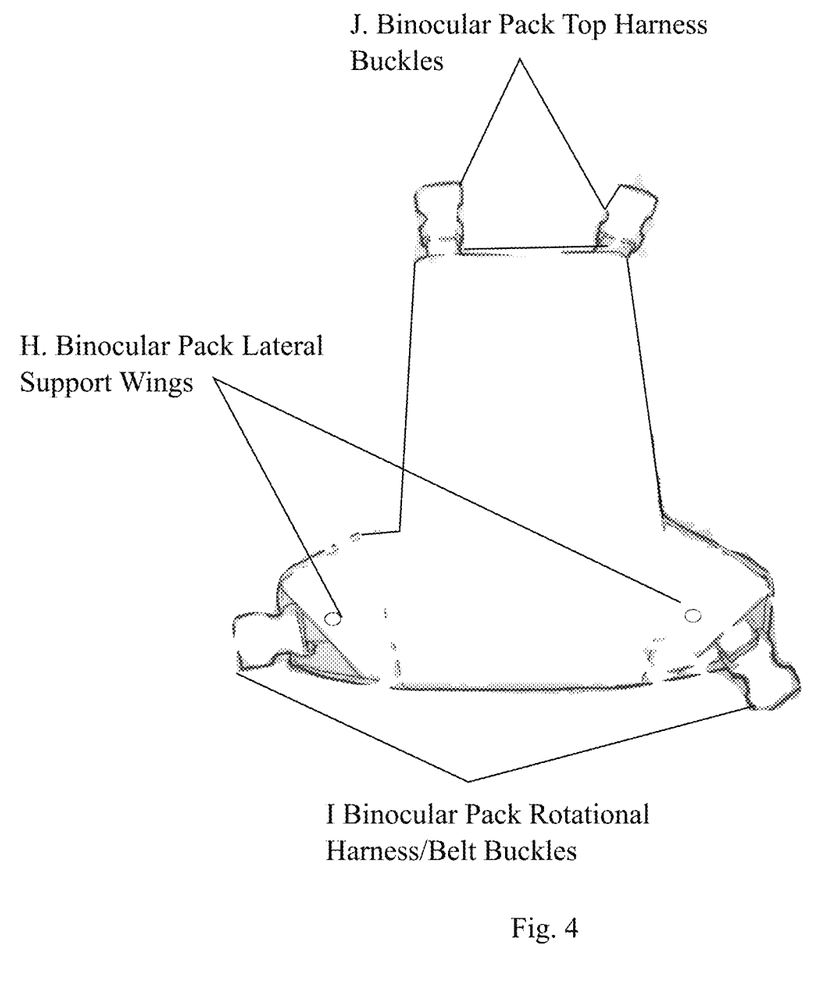
FIG. 4 is a back perspective view of the Self-Contained Binocular Sighting System apparatus in accordance with an embodiment of the present disclosure.

FIG. 4 is a back perspective view of the Self-Contained Binocular Sighting System apparatus showing: Binocular Pack Lateral Support Wings referenced as H., Binocular Pack Top Harness Buckles referenced as J., in accordance with an embodiment of the present disclosure. Straps with complementary buckles are fitted around a user for a snug and comfortable fit.

Figure 5:
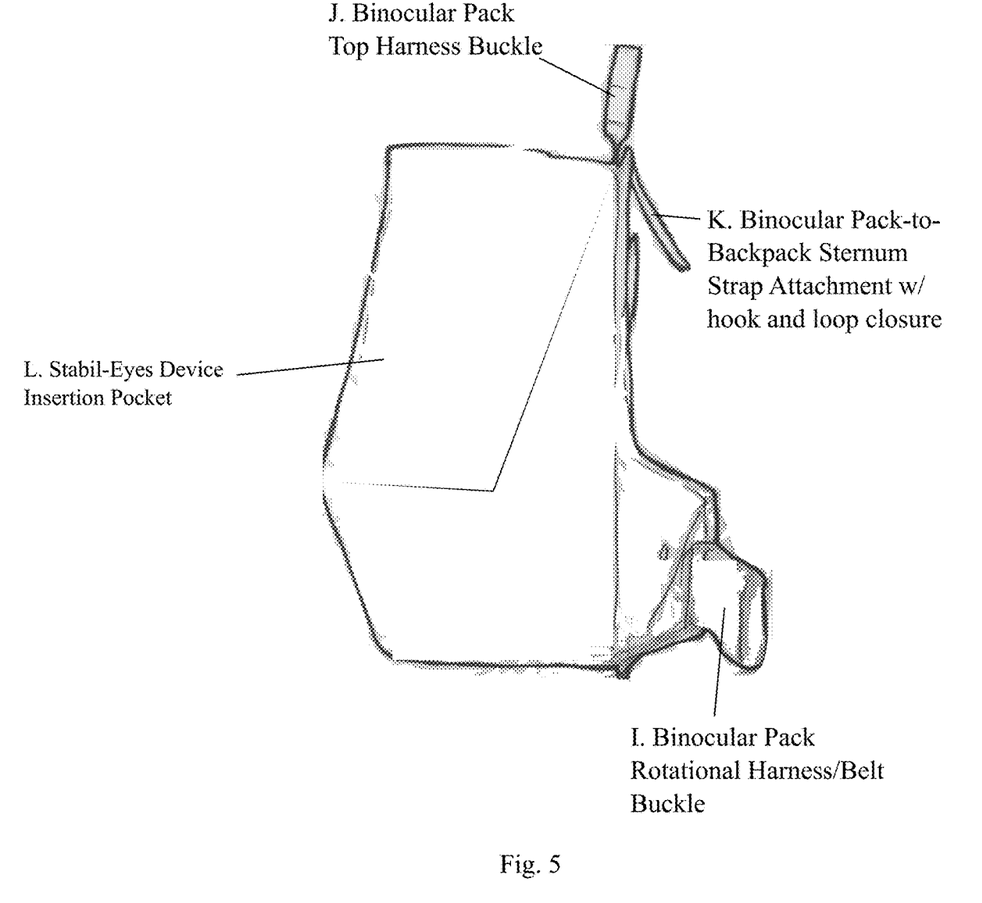
FIG. 5 is a side perspective view of the Self-Contained Binocular Sighting System apparatus in accordance with an embodiment of the present disclosure.

FIG. 5 is a side perspective view of the Self-Contained Binocular Sighting System apparatus showing: Binocular Pack Rotational Harness/Belt Buckle referenced as I., Binocular Pack Top Harness Buckle referenced as J., Binocular Pack-to-Backpack Sternum Strap Attachment w/hook and loop closure referenced as K., in accordance with an embodiment of the present disclosure. The binocular pack bino cover Q allows a user to wrap the disclosure within for a self-containment of the scope or binoculars and the Stabil-Eyes device.

FIG. 6 is a front perspective view of the Self-Contained Binocular Sighting System apparatus showing: Telescoping Binocular Support Arm referenced as D., Arm Support Attach Bracket referenced as E., Telescoping Arm Support referenced as F., Back Plate referenced as G., Stabil-Eyes Device Insertion Pocket with hook and loop closure referenced as I., Telescoping Binocular Support Arm Anchor Strap referenced as M., in accordance with an embodiment of the present disclosure. The angle A2 is depicted limited by the strap M and by the boss or surface of the back plate G.

The present disclosed Self-Contained Binocular Sighting System, also known as "Stabil-Eyes Binocular Sighting System," holds binoculars steady at the top of a telescoping and chest-mounted monopod housed in a harness/pack, similar to those that binocular users often use anyway. The device is simple to deploy and store, and is highly adjustable to the size of the individual and the specific viewing situation. Users can use their binoculars to view, virtually indefinitely, without fatigue. Once glassing is complete, the system allows for storage of the binoculars in the pack, without disassembling the device.

This invention is an improvement on what currently exists. This is the only solution to incorporate the simplicity of a telescoping monopod. No others address the set-up/take-down and storage problem in one elegant binocular solution, as does this invention. No others include storage and protection of binoculars in transport.

The combination of complex mechanisms that require transport, awkward set-up and take-down procedures, the resulting slowness in deployment and lack of integration with a packing system has rendered virtually all other devices commercially unavailable. People using binoculars in the field have a need to deploy the binoculars quickly and to store them quickly. If transport, set-up and take-down, is likely to take as much space and time as using a tripod, users will opt for the tripod. Hence, current solutions are not providing a practical, viable alternative.

Stabil-Eyes Binocular Sighting System, utilizes a simple mechanism which is lightweight, self-contained and easy to set-up and take down. The user never has to access another piece of equipment, nor assemble or disassemble any parts in use. Indeed, the user can access or store binoculars while on the move. The user can also shift to other fields of view instantly, without having to turn, re-level or adjust the set-up, as would be required with a tripod.

The back plate G, also known as a breast plate, can be inserted into the Stabil-Eyes Device Insertion pocket (L), with the pocket secured by hook-and-loop closure on the Binocular Pack Bino Cover (Q). Inserting the backplate G into the insertion pocket L secures the Stabil-Eyes Device to the pack or harness in an embodiment of the disclosure.

The Stabil-Eyes pack attaches to either an included harness or the user's backpack, using the Binocular Pack Top Harness Buckles (J) and the Binocular Pack Rotational Harness/Belt Buckles (I), if attaching to a harness. If attaching to a backpack, the Binocular Pack attaches to the Sternum Strap of the backpack using the Binocular Pack-to-Backpack Sternum Strap Attachment (K), and the Binocular Pack Rotational Harness/Belt Buckles (I) and the Binocular Pack-to-Belt Stabilizing Straps (N). Either way, the Stabil-Eyes Binocular Sighting System rests on the chest of the user, ready to deploy as needed.

Binoculars are mounted to the Binocular Mounting Bracket (A) and the Binocular Mounting Bracket (A) is then slid onto the Slide Mount (B). When the user is ready to use binoculars, the binocular pack cover is opened and the binoculars are deployed by lifting the Telescoping Binocular Support Arm (D) to the desired level, and then rotating the binoculars up to the desired angle for viewing, using the Slide Mount-to-Support Arm Attachment (C). The Telescoping Arm Support (F) and the Arm Support Bracket (E) allow the arm and binoculars to move forward and backward to a comfortable viewing position. The Telescoping Binocular Support Arm Anchor Strap (M) prevents the binoculars and Telescoping Arm from being able to "fall" too far from the front of the user's chest. From this position the user can make adjustments and view through the binoculars for as long as desired, with little or no physical support supplied by the user's arms and hands. When the user is ready to re-stow binoculars the process is reversed, the pack cover is closed, thereby providing protection for the binoculars when not in use.

The Binocular Mounting Bracket & Quick Release Connector allows for mounting of binoculars to the Slide Mount. The Slide Mount for Mounting Bracket holds the binocular-attached Binocular Mounting Bracket in place with the ability to slide binoculars forward for stowage, or slide them back for comfortable viewing. The Slide Mount to Support Arm Attachment connects the Slide Mount to the Telescoping Binocular Support Arm and permits vertical articulation of the binoculars with infinite adjustment capability within the Slide Mount's range of motion. The Telescoping binocular Support Arm permits the user to raise binoculars to any comfortable viewing height with infinite adjustability. Arm Support Attach Bracket secures the Telescoping Arm Support and the rest of the device to the Back Plate to prevent the device from unwanted up or down, left or right movement. The Telescoping Arm Support provides the connection between the Telescoping Binocular Support Arm and the Arm support Attach Bracket, Maintaining stability but allowing forward and back movement for comfortable viewing. The Back Plate holds the device in place preventing unwanted movement up or down, left or right. The Binocular Pack Lateral Support Wings provide additional lateral support for the device within the Binocular Pack. The Binocular Pack Rotational Harness/Belt Buckles allow for connection of the bottom of the Binocular Pack to the harness, belt or backpack waist belt. The Binocular Pack Top Harness Buckles allow connection of the top of the Binocular Pack to a harness. The Binocular Pack-to-Backpack Sternum Strap Attachment provides the option of attaching the top of the Binocular Pack to a backpack sternum strap instead of a harness. The Stabil-Eyes Device Insertion Pocket permits initial insertion of the device securely into the Binocular Pack. It also allows for replacement of the Back Plate or the entire device, and provides the option for the user to remove the device and use the Binocular Pack without it. The Telescoping Binocular Support Arm Anchor Strap restricts the forward movement of the Telescoping Binocular Support Arm. The Binocular Pack-to-Belt Stabilizing Straps provide users the option of anchoring the bottom of the Binocular Pack to a belt or backpack waist belt, instead of to a harness, or in addition to a harness. The Quick Release Binocular Connector screws into the binocular's standard tripod mount permitting quick mounting and dismounting of binoculars.

When the user is ready to deploy binoculars, the user opens the Binocular Pack cover, releases the clamps on the Telescoping Binocular Arm Support, raises the binoculars to the desired height and locks the clamps on the Telescoping Binocular Arm Support. The user then raises the binoculars to the desired vertical articulation and locks the Slide Mount at the desired level using the tightening knob. The binoculars are then slid back, toward the user's eyes by moving the binoculars and Binocular Mounting Bracket on the Slide Mount until they click into place.

The user is then free to utilize binoculars for virtually indefinite stable viewing, with 1-hand adjustment of focus and with 1-hand support of the binoculars at the lower part of the Telescoping Binocular Support Arm. Hands-free operation may be possible with the limiting movement insured by the Telescoping Binocular Arm Anchor Strap. If the user wishes to share binoculars with a companion, or simply view without use of the device, the Quick Release permits quick removal and replacement of the binoculars atop the device.

When viewing is complete and the user wants to stow the device, the process is reversed by sliding the Binocular Mounting Bracket forward on Slide Mount, loosening the knob on the Slide Mount allowing the binoculars to drop down to the vertical position, then releasing the clamps on the Telescoping Binocular Support Arm, collapsing the Arm into the Binocular Pack and replacing the Binocular Cover Although the operations of the method(s) herein are shown and described in a particular order, the order of the operations of each method may be altered so that certain operations may be performed in an inverse order or so that certain operations may be performed, at least in part, concurrently with other operations. In another embodiment, instructions or sub-operations of distinct operations may be implemented in an intermittent and/or alternating manner.

What is claimed is:

1. A scope assist device comprising:
   a scope bracket configured to rotatably attach to a scope mount;
   a telescoping arm configured to attach to the scope bracket in a first angle relative to the telescoping arm;
   a telescoping arm bracket configured to rotatably attach to the telescoping arm in a second angle relative to the telescoping arm;
   a back plate configured to support the telescoping arm bracket proximal a waist of a user and extend against and cover a chest of the user; and
   a chest pack configured to receive the back plate and secure the scope assist device to the chest of the user via an assembly thereof,
   wherein an insertion pocket defined by the chest pack covers the telescoping arm in assembly and stabilizes an overlap portion of the telescoping arm in use.

2. The device of claim 1, wherein the scope bracket is further configured to slidably receive a quick release type connector to a pair of binoculars.

3. The device of claim 1, wherein the first angle is greater than ninety degrees but limited to less than one hundred and eighty degrees by the scope bracket.

4. The device of claim 1, wherein the second angle is less than ninety degrees and limited thereto by the back plate.

5. The device of claim 1, wherein the back plate further comprises a sternum hook and loop attachment.

6. The device of claim 1, further comprising an anchor strap configured to limit the second angle to less than ninety degrees.

7. The device of claim 1, further comprising a harness configured to receive the back plate and secure the device to the chest of the user.

8. The device of claim 7, wherein the harness further comprises a lateral support wing on each of a right and a left side.

9. The device of claim 7, wherein the harness further comprises a plurality of rotatable straps.

10. The device of claim 1, further comprising at least one strap configured to secure the device to a belt of the user.

11. The device of claim 1, wherein the telescoping arm comprises a plurality of concentric segments.

12. The device of claim 11, further comprising a lock on each of the plurality of concentric segments to secure each in a respective relation to another of the plurality of concentric segments.

13. The device of claim 1, wherein the chest pack is secured to the chest of the user via a plurality of rotatable straps.

14. The device of claim 1, wherein the chest pack is secured to the chest of the user via a plurality of rotatable buckles and straps.

15. The device of claim 1, wherein the scope is a pair of binoculars.

16. The device of claim 1, wherein the scope is a monocular.

17. A scope mount and scope assist system comprising:
   a scope bracket configured to rotatably attach to the scope mount;
   a telescoping arm configured to attach to the scope bracket in a first angle greater than ninety degrees relative to the telescoping arm;
   a telescoping arm bracket configured to rotatably attach to the telescoping arm in a second angle less than ninety degrees relative to the telescoping arm;
   a breastplate configured to support the telescoping arm bracket proximal a waist of a user and extend against and cover a chest of the user; and
   an insertion pocket defined in a chest pack covering the back plate and securing the scope assist device to the chest of the user via the covering thereof,
   wherein the insertion pocket in a closed state covers the telescoping arm and supports an overlap portion of the telescoping arm in an open state.

18. The system of claim 17, further comprising a harness configured to secure the breastplate against the chest of the user.

19. The system of claim 18, wherein the insertion pocket is configured to cover the scope mount and the scope assist system fully assembled in use or not in use.

* * * * *